(12) United States Patent
Li

(10) Patent No.: US 11,579,450 B1
(45) Date of Patent: Feb. 14, 2023

(54) HOLOGRAPHIC DIFFUSER DISPLAY

(71) Applicant: Facebook Technologies, LLC, Menlo Park, CA (US)

(72) Inventor: Gang Li, Seattle, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 336 days.

(21) Appl. No.: 16/992,791

(22) Filed: Aug. 13, 2020

(51) Int. Cl.
  *G02B 27/01* (2006.01)
  *G02B 5/32* (2006.01)

(52) U.S. Cl.
  CPC .......... *G02B 27/0172* (2013.01); *G02B 5/32* (2013.01); *G02B 2027/0174* (2013.01)

(58) Field of Classification Search
  CPC .................... G02B 27/0172; G02B 2027/0174
  USPC ........................................................... 359/13
  See application file for complete search history.

(56) References Cited

U.S. PATENT DOCUMENTS

| | | | | |
|---|---|---|---|---|
| 6,124,954 | A * | 9/2000 | Popovich | G02B 27/017 349/201 |
| 6,509,982 | B2 * | 1/2003 | Steiner | G02B 5/32 359/13 |
| 6,714,328 | B2 * | 3/2004 | Steiner | G02B 5/32 359/13 |
| 2002/0021461 | A1 * | 2/2002 | Ono | G02B 27/0103 359/13 |
| 2005/0200962 | A1 * | 9/2005 | Voloschenko | G02B 5/0278 359/630 |
| 2017/0227764 | A1 * | 8/2017 | Kim | G02B 27/0103 |
| 2020/0166764 | A1 * | 5/2020 | Lee | G02B 30/00 |
| 2020/0174255 | A1 * | 6/2020 | Hollands | G02B 27/0172 |
| 2022/0075196 | A1 * | 3/2022 | Waldern | G02B 6/34 |

FOREIGN PATENT DOCUMENTS

| | | | |
|---|---|---|---|
| DE | 102020209021 A1 * | 1/2022 | |
| WO | WO-2010035607 A1 * | 4/2010 | G02B 27/0172 |

* cited by examiner

*Primary Examiner* — Collin X Beatty
(74) *Attorney, Agent, or Firm* — Pequignot + Myers; Matthew A. Pequignot

(57) ABSTRACT

A display uses a projector to project an image onto a holographic diffuser. The holographic diffuser scatters light of the projected image to at least one holographic element having optical power, which forms an image in angular domain for a direct observation by a user. The holographic diffuser and the holographic optical element, such as a freeform lens or a reflector, may be disposed on a transparent substrate in which the image light propagates. The architecture that immerses a display (HOE diffuser) and the eyepiece lens into the substrate may reduce the form factor of the system compared to the VR headset architecture, while being suitable for operation in AR configuration.

16 Claims, 5 Drawing Sheets

HOLOGRAPHIC DIFFUSER DISPLAY

TECHNICAL FIELD

The present disclosure relates to optical devices, and in particular to display systems and modules.

BACKGROUND

Head mounted displays (HMD), helmet mounted displays, near-eye displays (NED), and the like are being used for displaying virtual reality (VR) content, augmented reality (AR) content, mixed reality (MR) content, etc. Such displays are finding applications in diverse fields including entertainment, education, training and science, to name just a few examples. The displayed VR/AR/MR content can be three-dimensional (3D) to enhance the experience and to match virtual objects to real objects observed by the user. Many new applications in areas where visual information presentation is required become possible.

To provide better optical performance, HMD systems and modules may include a large number of components such as lenses, waveguides, display panels, gratings, miniature light sources, etc. Because a display of an HMD or NED is usually worn on the head of a user, a large, bulky, unbalanced, and/or heavy display device would be cumbersome and may be uncomfortable for the user to wear. Compact, lightweight, and efficient head-mounted display devices and modules are therefore desirable. It is further desirable to retain wide field of view and large eyebox size of a compact display system.

BRIEF DESCRIPTION OF THE DRAWINGS

Exemplary embodiments will now be described in conjunction with the drawings, in which.

DETAILED DESCRIPTION

Figure 1:
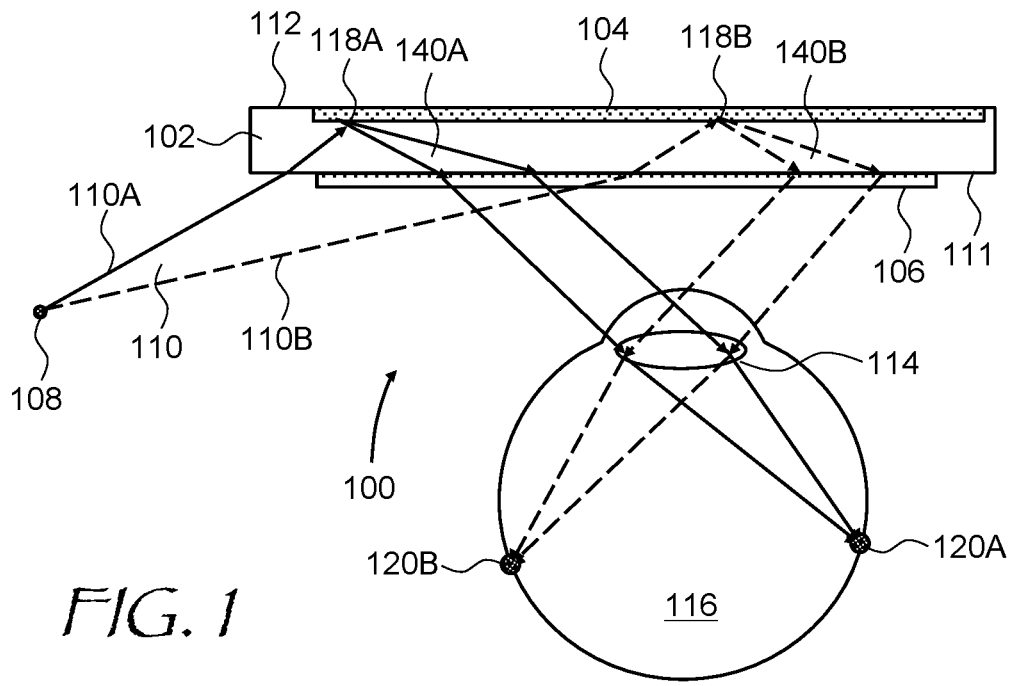
FIG. 1 is a schematic cross-sectional view of a holographic display of this disclosure, the display being based on a holographic diffuser and a holographic lens.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1-4 and 6, similar reference numerals denote similar elements.

The term "holographic", when used with reference to a diffuser, a lens, a reflector, or another passive optical element, denotes an optical element including a hologram that performs the intended function selectively depending on a direction of an impinging optical beam. Only light rays having certain pre-defined angles w.r.t. the hologram are redirected, scattered, reflected, refracted, focused, collimated, defocused, etc., in accordance with the geometry of the hologram, while the rays at other angles simply pass through the hologram substantially without redirection. This may prove useful in providing a compact folded layout. The hologram itself may be obtained by a holographic exposure of a photosensitive material, or by replication, or by any other suitable method. Herein, the term "substantially without redirection" means that, although some amount of light scattering may occur, otherwise the hologram acts as a transparent medium for light rays at angles other than the pre-defined angles of incidence. The term "holographic projector" is taken to mean a projector that retains 3D information about objects in a scene or imagery being displayed by such projector. A holographic projector may include, for example, a spatial light modulator coupled to a coherent light source such as a laser.

A retinal projection display may be configured for operation as an augmented reality (AR) display. A retinal projection display forms an image in angular domain that is projected into the eye's pupil to form an image in linear domain (albeit with a curved field) on a retina of the eye. Retinal projection displays may include holographic projectors that are capable of providing 3D visual information, which enables the user's eye to naturally focus on 3D objects at different virtual distances. A proper combination of 3D projecting with binocular vision enables one to reduce the so-called vergence-accommodation conflict.

One challenge of retinal projection type AR displays, including holographic projection displays, is a limited etendue of such display configurations. Etendue is a product of a beam size and beam divergence in one dimension (e.g. X-size and X-angle) or in two dimensions (e.g. XY area and XY solid angle). In display terms, the etendue is equivalent to a product of a field of view (FOV) and an exit pupil size of the display. Herein, FOV is an observable angular field (e.g. horizontal viewing angle range times vertical viewing angle range), and the exit pupil size is horizontal size times vertical size.

Etendue is known to stay constant in optical systems based on lenses and mirrors. If, for example, a retinal projection display is constructed to have a large FOV, the exit pupil size will be small, and vice versa. Waveguide-based displays usable in AR applications also often have a comparatively small etendue. It is desirable to increase the display etendue, as it allows wide-field viewing in a large eyebox.

Virtual reality (VR) displays usually do not have the limited etendue problem. A source of the image in VR displays is a diffusive screen or a display panel, with each pixel emitting into a wide solid angle. The user of a VR displays views the diffusive screen or display panel through an ocular lens. Such an optical system has a high etendue, enabling the user to observe wide-FOV images. Of course, one drawback of a VR display is that the outside environment cannot be directly observed. To be able to observe outside environment, one needs to provide a display device with the screen or another image source, as well as the ocular lens system, that would be transparent to the outside light.

This disclosure describes a display configuration based on an off-axis holographic diffuser coupled to an off-axis a holographic ocular lens system transparent to the outside light. A holographic diffuser scatters light only within a pre-defined off-axis cone of angles. Holographic optical elements, such as holographic optical reflectors or lenses, only redirect the impinging light rays that are within a pre-defined off-axis cone of angles. External light impinging outside of the working angular ranges of holographic optical elements may propagate to the eyes of the user without substantial losses or scatter, enabling the outside world view simultaneously with viewing the display images. In such a manner, a high-etendue augmented reality (AR) display device may be constructed.

In accordance with the present disclosure, there is provided a display comprising a substrate transparent for visible light, the substrate having first and second opposed surfaces. A holographic diffuser is disposed at the second surface of the substrate. A projector projects an image onto the holographic diffuser through the first surface of the substrate. The holographic diffuser is configured to scatter light of the image projected thereon back to the first surface within a pre-defined range of angles. A first holographic element having optical power is configured to receive the light scattered by the holographic diffuser and form a corresponding image in angular domain at a distance from the first holographic element. The holographic diffuser may be immersed into the substrate, and/or coupled to the substrate without an air gap. In some embodiments, the pre-defined range of angles of scattering light is at least two times wider than a cone angle of the light emitted by the projector and converging to a single pixel of the image projected onto the projector.

The first holographic element may include a holographic lens disposed at the first surface of the substrate, and/or a holographic reflector disposed at the second surface of the substrate and configured to reflect the light scattered by the holographic diffuser and reflected from the first surface back towards the first surface of the substrate. An angle of incidence of light emitted by the projector onto the holographic diffuser may exceed 45 degrees. In some embodiments, the first holographic element is a first holographic reflector disposed at the first surface of the substrate and configured to reflect the light scattered by the holographic diffuser back towards the second surface of the substrate. In such embodiments, the display may further include a second holographic reflector having optical power, disposed at the second surface of the substrate, and configured to form the image in angular domain. The second holographic reflector may be coupled to the holographic diffuser without an air gap. The first holographic reflector, the substrate, the holographic diffuser, and the second holographic reflector may form an optical stack, which may optionally transmit at least a portion of outside light, enabling a user of the display to see outside environment through the optical stack. An angle of incidence of light emitted by the projector onto the optical stack may exceed 45 degrees.

In accordance with the present disclosure, there is provided a method of displaying an image. The method includes projecting an image through a first surface of a transparent substrate onto a holographic diffuser disposed at a second surface of the substrate opposed to the first surface; scattering, using the holographic diffuser, light of the image projected thereon back to the first surface within a pre-defined range of angles; and forming, using a first holographic element having optical power, an image in angular domain at a distance from the first holographic element, the image in angular domain corresponding to the image projected onto the holographic diffuser. The light of the image projected onto the holographic diffuser may be scattered at angles exceeding a total internal reflection (TIR) critical angle in the substrate.

In embodiments where first holographic element is a holographic reflector disposed at the first surface of the substrate for reflecting the light back towards the second surface of the substrate, the image in angular domain may be formed using the first holographic element and a second holographic element having optical power, the second holographic element being disposed at the second surface of the substrate. The second holographic element may include a holographic reflector forming the image in angular domain at a distance from the second holographic element.

In accordance with the present disclosure, there is further provided a display comprising a projector for projecting an image, a holographic diffuser downstream of the projector for receiving the image and scattering light of the image within a pre-defined range of angles, and a first holographic element downstream of the holographic diffuser, the first holographic element having optical power. The first holographic element is configured for receiving the light scattered by the holographic diffuser and for forming an image in angular domain corresponding to the image projected by the projector, at a distance from the first holographic element. The display may further include a transparent substrate having first and second opposed surfaces, such that the holographic diffuser is disposed at the second surface of the substrate, and the first surface of the substrate is disposed in an optical path between the projector and the holographic diffuser.

In embodiments where first holographic element is a holographic reflector disposed at the first surface of the substrate to reflect the light back towards the second surface of the substrate, the display may further include a second holographic element having optical power disposed at the second surface of the substrate. The second holographic element may be configured to form the image in angular domain. In some embodiments, the holographic diffuser, the substrate, and the first and second holographic elements form an optical stack, and the pre-defined range of angles is above a total internal reflection (TIR) critical angle for the light scattered by the holographic diffuser into the substrate.

Referring now to FIG. 1, a display 100 includes a projector 108 and a substrate 102 having first 111 and second 112 opposed optical surfaces. The substrate 102 is transparent for visible light. The substrate may be e.g. a glass plate, a place of a transparent plastic, etc. A holographic diffuser 104 is disposed at the second (distal) surface 112 of the substrate 102. The holographic diffuser 104 may be immersed into the substrate 102 as shown, or may be disposed on top of the substrate 102. A holographic lens 106, in this case a transmissive freeform holographic lens, is disposed at the first (proximal) surface 111 of the substrate 102. The holographic lens 106 is configured to receive light scattered by the holographic diffuser 104. The holographic lens 106 may be disposed on the first surface 111 of the substrate 102 as shown, or may be immersed into the substrate 102. In the illustrated off-axis configuration, angles of incidence onto holographic optical elements may exceed 45 degrees, or even may exceed 60 degrees w.r.t. a normal to the holographic optical elements.

In operation, the projector 108 emits a beam of light 110 projecting an image onto the holographic diffuser 104 through the first surface 111 of the substrate 102. The holographic diffuser 104 is configured to scatter the emitted light 110 of the projected image back to the first surface 111 of the substrate 102. The holographic diffuser 104 scatters the emitted light 110 within a pre-defined range of angles. The holographic lens 106 forms an image in angular domain at a pupil 114 of an eye 116 located a distance from the holographic lens 106.

The image in angular domain formed by the holographic lens 106 and projected into the eye 116 corresponds to the image projected by the projector 108. Projection of two image pixels, A and B (pixels not shown), will be considered for illustration of image formation. A first ray of light 110A, shown in solid lines, represents pixel A, and a second ray of light 110B, shown in dashed lines, represents pixel B of the image to be displayed. The first 110A and second 110B rays are chief rays of corresponding converging light beams (not shown for brevity) that are being focused in vicinity of the holographic diffuser 104. The first ray 110A impinges onto the holographic diffuser 104 at a first location 118A, and the second ray 110B impinges onto the holographic diffuser 104 at a second location 118B. At each location, the holographic diffuser 104 scatters the emitted light 110 within a pre-defined range of angles defined by the geometry of a hologram contained in the holographic diffuser 104. A light cone 140A scattered at the first location 118A gets collimated by the holographic lens 106, propagates through the pupil 114, and gets focused by the eye 116 at a first location 120A. Similarly, a light cone 140B scattered at the second location 118B gets collimated by the holographic lens 106, propagates through the pupil 114, and gets focused by the eye 116 at a second location 120B. It is noted that the second ray of light 110B may propagate through the holographic lens 106 before impinging onto the holographic diffuser 104 substantially without being collimated or focused by the holographic lens 106, since the hologram of the holographic lens 106 is configured to only collimate or focus light beams propagating within a certain pre-defined range of incidence angles.

The projector 108 may, but does not have to, be a holographic projector including a spatial light modulator coupler to a coherent source of light. One advantage of the holographic projector is that has the depth information of various objects may be present in a displayed 3D virtual imagery carried by the light beam 110. The display 100 may be constructed to take advantage of the holographic nature of the diffuser 104 to preserve the depth information in an image being displayed to a user. The hologram of the holographic diffuser 104 may be obtained by providing a two-beam exposure of a photosensitive material of a hologram, where one of the exposing beams has the desired divergence characteristic corresponding to the range of angles of scattering by the holographic diffuser 104. The wavefront modulated by holographic projector should be carefully calculated based on properties of the holographic diffuser 104.

Figure 2:
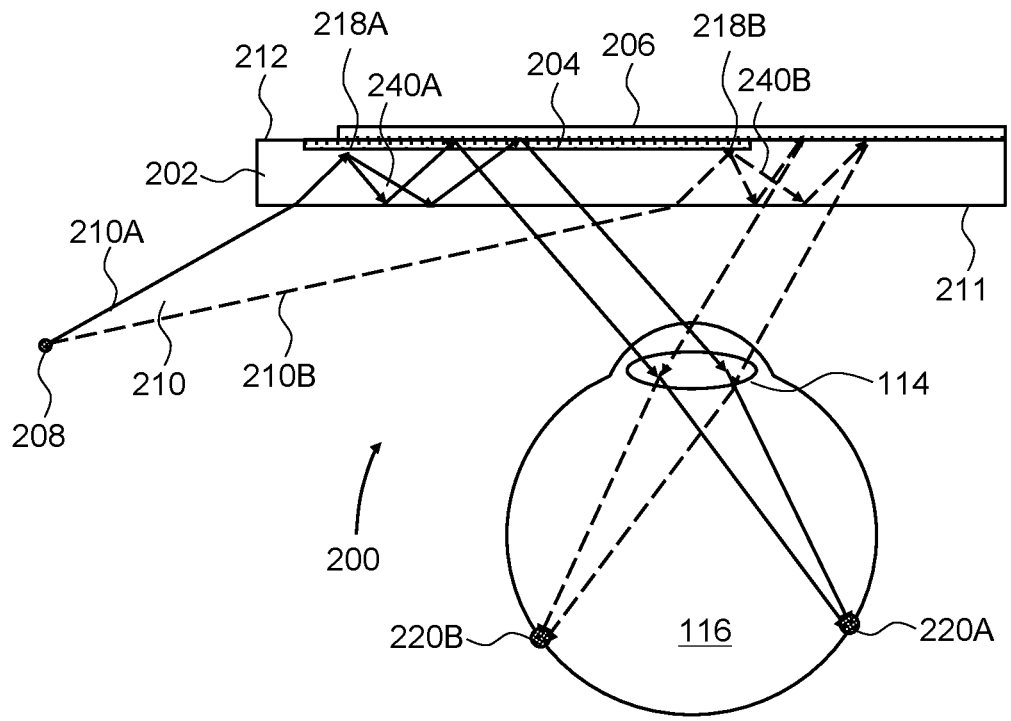
FIG. 2 is a schematic cross-sectional view of a holographic display of this disclosure, the display being based on a holographic diffuser and a holographic reflector.

Turning to FIG. 2, a display 200 is similar to the display 100 of FIG. 1. The display 200 of FIG. 2 includes a projector 208, e.g. a holographic projector described above, and a substrate 202 having first 211 and second 212 opposed optical surfaces, e.g. a glass plate. The substrate 202 is transparent for visible light. A holographic diffuser 204 is disposed at the second (distal) surface 212 of the substrate 202. The holographic diffuser 204 may be immersed into the substrate 2102 as shown, or may be disposed on top of the substrate 202 in some embodiments. A holographic reflector 206 is also disposed at the second surface 212. The holographic reflector 206 may be disposed in contact with the holographic diffuser 204 as shown, or may be spaced apart from the holographic diffuser 204 and the second surface 212. The holographic diffuser 204 may be immersed into the substrate 202, or e.g. may be in contact with the second surface 212 of the substrate 202, as shown. The holographic reflector 206 is configured to receive light scattered by the holographic diffuser 106 and reflected from the first surface 211 of the substrate 202 back towards the second surface 212. In the illustrated off-axis configuration, angles of incidence onto holographic optical elements may exceed 45 degrees, or even may exceed 60 degrees w.r.t. a normal to the holographic optical elements.

In operation, the projector 208 emits a beam of light 210 projecting an image onto the holographic diffuser 204 through the first surface 211 of the substrate 202. The holographic diffuser 204 scatters the emitted light 210 of the projected image back to the first surface 211 of the substrate 202. The holographic diffuser 204 scatters the emitted light 210 within a pre-defined range of angles, that is preferably above a total internal reflection (TIR) critical angle for the light reflected by the holographic diffuser 204 into the substrate 202. When the range of angles of the scattered light is above the TIR critical angle, the scattered light is reflected from the first surface 211 back to the second surface 212, propagates through the holographic diffuser 204 at angles outside of the scattering angle range of the holographic diffuser 204, and impinges onto the holographic reflector 206, which now reflects the light at angles below the TIR critical angle, forming the image in angular domain at the pupil 114 of the eye 116.

Similarly to the display 100 of FIG. 1, the image in angular domain is formed by a holographic element having optical (i.e. focusing, collimating, defocusing) power—the holographic reflector 206 of the display 200 of FIG. 2, and is projected into the eye 116. By way of example, a first ray of light 210A, shown in solid lines, represents pixel A, and a second ray of light 210B, shown in dashed lines, represents pixel B of the image to be displayed. The first 210A and second 210B rays are chief rays of corresponding light beams, not shown for brevity, that are being focused in vicinity of the holographic diffuser 204. The first ray 210A impinges onto the holographic diffuser 204 at a first location 218A, and the second ray 210B impinges onto the holographic diffuser 204 at a second location 218B. At each location, the holographic diffuser 204 scatters the emitted light 210 within a pre-defined range of angles defined by the geometry of a hologram contained in the holographic diffuser 204. A light cone 240A scattered at the first location 218A reflects by TIR from the first surface 211 and gets collimated by the holographic reflector 206, propagates through the first surface 211 of the substrate 202, reaches the pupil 114, and gets focused by the eye 116 at a first location 220A. Similarly, a light cone 240B scattered at the second location 218B gets collimated by the holographic reflector 206, propagates through the first surface 211 of the substrate 202, reaches the pupil 114, and gets focused by the eye 116 at a second location 220B forming pixel B of the image on the eye 116 retina.

Figure 3:
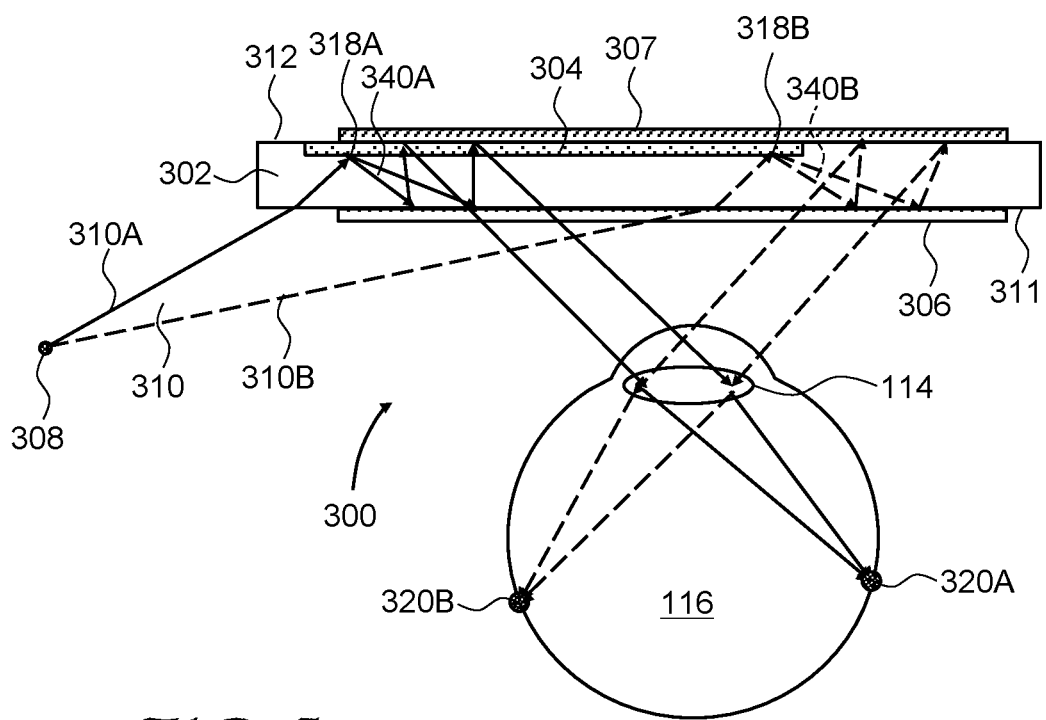
FIG. 3 is a schematic cross-sectional view of a holographic display of this disclosure, the display being based on a holographic diffuser and a pair of holographic reflectors.

Referring now to FIG. 3, a display 300 is similar to the displays 100 of FIG. 1 and 200 of FIG. 2. The display 300 of FIG. 3 includes not one but two holographic elements having optical power. The display 300 of FIG. 3 includes a projector 308, e.g. a holographic projector described above, and a substrate 302 having first 311 and second 312 opposed optical surfaces. The substrate 302 is transparent for visible light. A holographic diffuser 304 is disposed at the second (distal) surface 312 of the substrate 302. The holographic diffuser 304 may be immersed into the substrate 302, or may be in contact with the second surface 312 of the substrate 202. A first holographic reflector 306 is disposed at the first surface 311, and a second holographic reflector 307 is disposed at the second surface 312 of the substrate 302 over the holographic diffuser 304. The first holographic reflector 306 is preferably disposed in contact with the first surface 311, as shown. The second holographic reflector 307 may be disposed in contact with the holographic diffuser 304, but may also be spaced apart from the holographic diffuser 304 in some embodiments. The first holographic reflector 306 is configured to receive light scattered by the holographic diffuser 106 and redirect the light 310 back towards the second holographic reflector 307, which redirects the light 310 to the eye 116 forming the image in angular domain at the pupil 114. In the illustrated off-axis configuration, angles of incidence onto holographic optical elements may exceed 45 degrees, or even may exceed 60 degrees w.r.t. a normal to the holographic optical elements.

In operation, the projector 308 emits a beam of light 310 projecting an image onto the holographic diffuser 304 through the first surface 311 of the substrate 302. The beam of light 310 emitted by the projector 308 also propagates through the first holographic reflector 306, which substantially does not reflect the light 310, because the first holographic reflector 306 is not configured to reflect rays entering the first holographic reflector 306 at the angles of incidence of the emitted light 310. The holographic diffuser 304 scatters the emitted light 310 of the projected image back to the first surface 311 of the substrate 302. The holographic diffuser 304 scatters the emitted light 310 within a pre-defined range of angles, that is preferably above a total internal reflection (TIR) critical angle for the light reflected by the holographic diffuser 304 into the substrate 302.

A reference beam angle of the first holographic reflector 306 should preferably be larger than the TIR critical angle, such that light above the TIR critical angle is diffractively reflected by the first holographic reflector 306. In such a configuration, any light that is not redirected by the first holographic reflector 306 is reflected back to the second surface 312, preventing this undesired light from reaching the eye 116. Scattered light cones 340A and 340B redirected by the first holographic reflector 306 impinge onto the second holographic reflector 307, which reflects the light to propagate to the eye 116, forming the image in angular domain at the pupil 114 of the eye 116. Presence of two optical elements, specifically the first 306 and second 307 holographic reflectors, enables one to better mitigate optical aberrations when forming the image in angular domain at the eye pupil 114.

The following example considers the projection of two pixels if an image, pixel A and pixel B, not shown, of the image to be displayed. A first ray of light 310A, shown in solid lines, represents pixel A, and a second ray of light 310B, shown in dashed lines, represents pixel B. The first 310A and second 310B rays are chief rays of corresponding light beams, not shown for brevity. The first ray 310A impinges onto the holographic diffuser 304 at a first location 318A, and the second ray 310B impinges onto the holographic diffuser 304 at a second location 318B. At each location, the holographic diffuser 304 scatters the emitted light 310 within a pre-defined range of angles defined by the geometry of a hologram contained in the holographic diffuser 304. The light cone 340A scattered at the first location 318A gets collimated by the first 306 and second 307 holographic reflectors, propagates through the pupil 114, and gets focused by the eye 116 at a first location 320A. Similarly, the light cone 340B scattered at the second location 318B gets collimated by the first 306 and second 307 holographic reflectors, propagates through the pupil 114, and gets focused by the eye 116 at a second, different location 320B. When the angle of incidence of light in the light cones 340A, 340B is selected to be above TIR critical angle at the first surface 311 of the substrate 302, residual light that is not redirected by the first holographic reflector 306 is reflected by TIR and does not enter the eye pupil 114.

Figure 4:
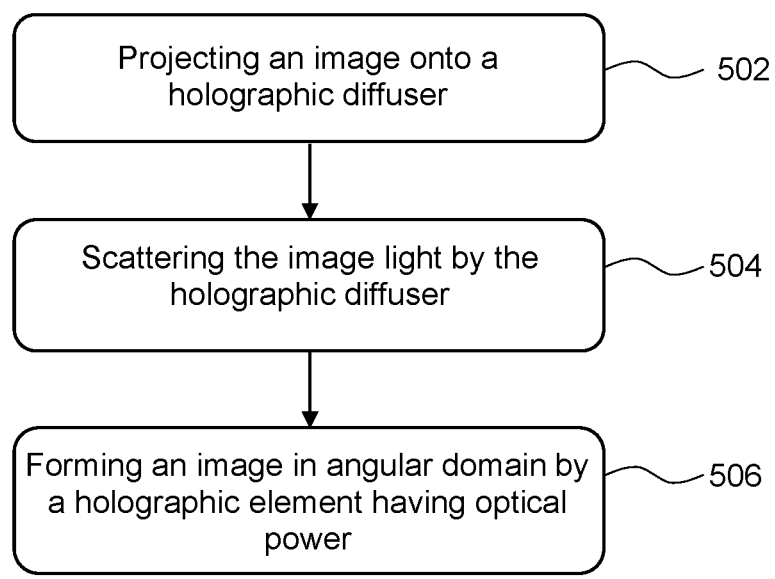
FIG. 4 is a flow chart of a method for displaying an image according to this disclosure.

Referring to FIG. 4 with further reference to FIG. 1 as a non-limiting illustration, a method 500 (FIG. 4) includes projecting (502) an image through the first surface (FIG. 1, 111) of the transparent substrate 102 onto the holographic diffuser 104 disposed at the second surface 112 of the substrate 102 opposed to the first surface 111. The light 110 of the image projected onto the holographic diffuser 104 is scattered (504) by the holographic diffuser 104 back to the first surface 111 within a pre-defined range of angles. The method 500 further includes forming (506), using at least the first holographic element 106, an image in angular domain at a distance from the first holographic element 106. The image in angular domain corresponds to the image projected onto the holographic diffuser 104. The light 110 of the image projected onto the holographic diffuser 104 may be scattered at angles exceeding TIR critical angle for the substrate 102, to make sure that no extraneous light reaches the user's eye.

In some embodiments of the method 500, the image in angular domain is formed using not one but two holographic elements having a freeform optical profile, for better focusing/collimation and aberrations correction. Continuing to refer to FIG. 4 with further reference to FIG. 3 as a non-limiting illustration, the image in angular domain may be formed (506) using the first 306 and second 307 holographic reflectors disposed at the second 112 and first 111 surfaces of the substrate 102 respectively.

Figure 5:
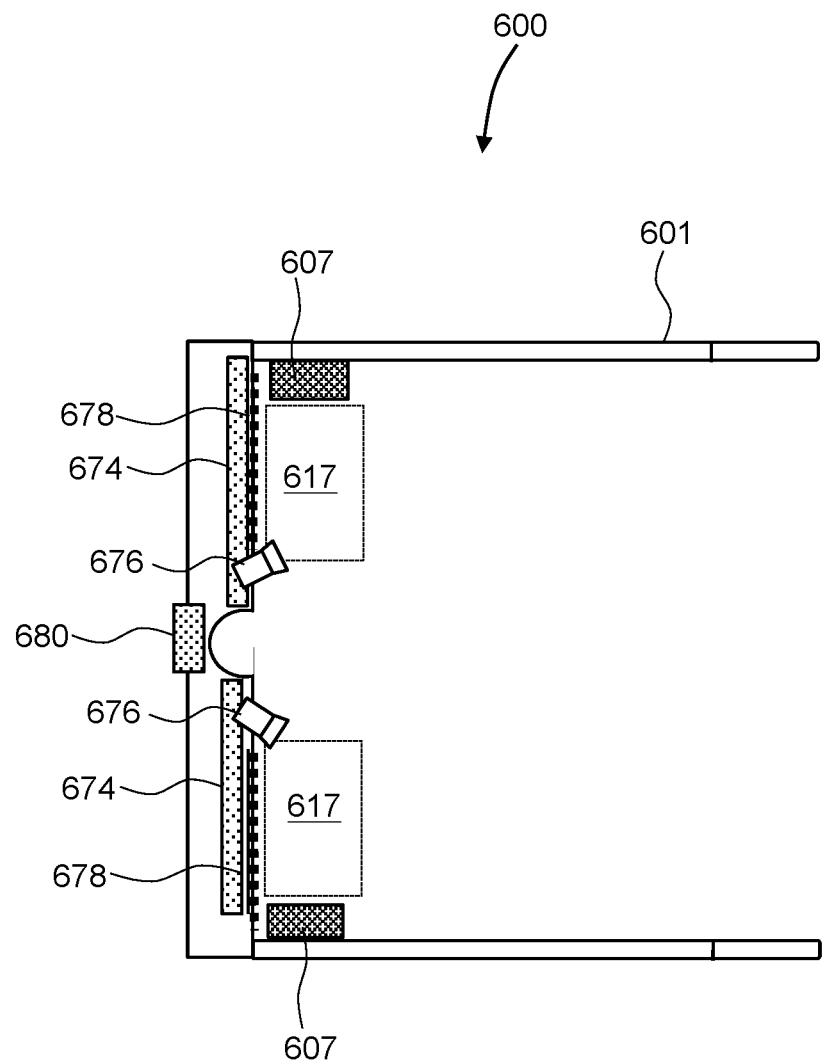
FIG. 5 is a view of an augmented reality (AR) display of this disclosure having a form factor of a pair of eyeglasses.

Turning now to FIG. 5, an AR near-eye display 600 includes a frame 601 having a form factor of a pair of eyeglasses. The frame 601 supports, for each eye: a projector 607; an optical stack 674 coupled to the projector 607; an eye-tracking camera 676; and a plurality of eyebox illuminators 678, shown as black dots, for illuminating an eye in an eyebox 617. Herein, the term "eyebox" means a geometrical area where an image of acceptable quality may be observed by an eye of a user. Increasing the pupil size reduces the FOV to a point where it is not very practical nor convenient. The eye illuminators 678 may be supported by the optical stack 674. For AR applications, the optical stack 674 can be transparent or translucent to enable the user to view the outside world together with the images projected into each eye and superimposed with the outside world view. The images projected into each eye may include objects disposed with a simulated parallax, so as to appear immersed into the real world view.

The optical stacks 674 may include any of the stacks of optical elements disclosed herein, including e.g. a stack of the holographic diffuser 104, the substrate 102, and the holographic lens 106 of the display 100 of FIG. 1; a stack of the holographic diffuser 204 and the holographic reflector 206 on the substrate 202 of the display 200 of FIG. 2; a stack of the holographic diffuser 304, the substrate 302, and the first 306 and second 307 holographic reflectors of the display 300 of FIG. 1. The holographic optical elements in the stacks 674 may be constructed so as to transmit as much outside light as possible through the stacks 674, to enable the user to observe the outside environment while viewing the AR imagery projected by the stacks 674 into the eyes of the user.

The purpose of the eye-tracking cameras 676 is to determine position and/or orientation of both eyes of the user. Once the position and orientation of the user's eyes are known, the eye pupil positions are known, a controller 680 of the display 600 may compute the required images for the projector to project onto a corresponding holographic diffuser to form an image in angular domain at the location of the eye pupils. A gaze convergence distance and direction may also be determined. The imagery displayed may be adjusted dynamically to account for the user's gaze, for a better fidelity of immersion of the user into the displayed augmented reality, and/or to provide specific functions of interaction with the displayed augmented reality.

In operation, the eye illuminators 678 illuminate the eyes at the corresponding eyeboxes 614, to enable the eye-tracking cameras 676 to obtain the images of the eyes, as well as to provide reference reflections termed glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 614.

The controller 680 may then process images obtained by the eye-tracking cameras 676 to determine, in real time, the eye gazing directions of both eyes of the user. In some embodiments, the image processing and eye position/orientation determination functions may be performed by a dedicated controller or controllers of the AR near-eye display 600.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 6:
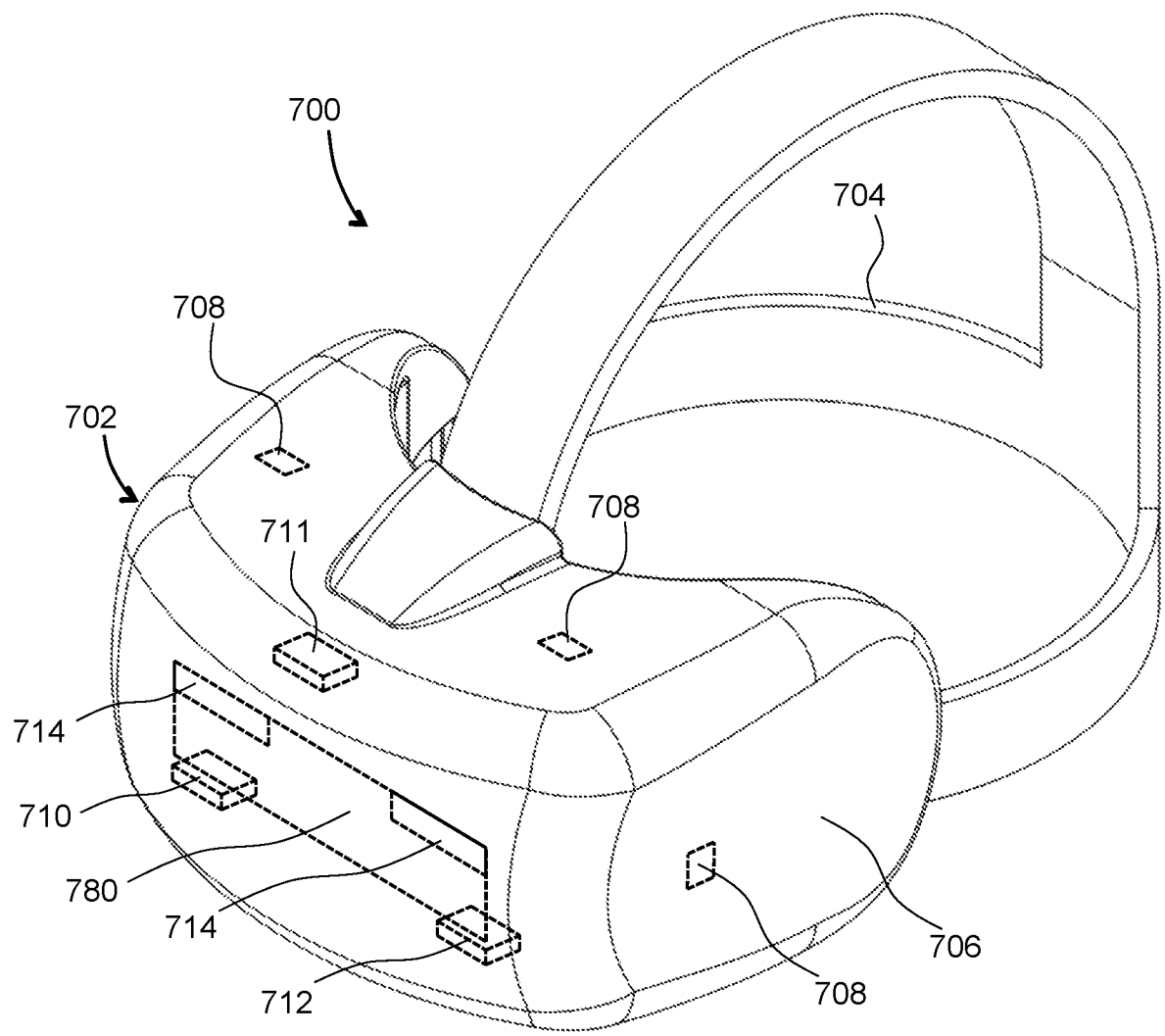
FIG. 6 is an isometric view of an example of a head-mounted virtual reality (VR) display of this disclosure.

Turning to FIG. 6, an HMD 700 is an example of an AR/VR wearable display system which encloses the user's face, for a greater degree of immersion into the AR/VR environment. Any of the displays considered herein may be used in the HMD 700. The function of the HMD 700 is to augment views of a physical, real-world environment with computer-generated imagery, or to generate the entirely virtual 3D imagery. The HMD 700 may include a front body 702 and a band 704. The front body 702 is configured for placement in front of eyes of a user in a reliable and comfortable manner, and the band 704 may be stretched to secure the front body 702 on the user's head. A display system 780 may be disposed in the front body 702 for presenting AR/VR imagery to the user. The display system 780 may include any of the displays considered herein, e.g. the display 100 of FIG. 1, the display 200 of FIG. 2, the display 300 of FIG. 3, and/or the display 400 of FIG. 4. Sides 706 of the front body 702 may be opaque or transparent.

In some embodiments, the front body 702 includes locators 708 and an inertial measurement unit (IMU) 710 for tracking acceleration of the HMD 700, and position sensors 712 for tracking position of the HMD 700. The IMU 710 is an electronic device that generates data indicating a position of the HMD 700 based on measurement signals received from one or more of position sensors 712, which generate one or more measurement signals in response to motion of the HMD 700. Examples of position sensors 712 include: one or more accelerometers, one or more gyroscopes, one or more magnetometers, another suitable type of sensor that detects motion, a type of sensor used for error correction of the IMU 710, or some combination thereof. The position sensors 712 may be located external to the IMU 710, internal to the IMU 710, or some combination thereof.

The locators 708 are traced by an external imaging device of a virtual reality system, such that the virtual reality system can track the location and orientation of the entire HMD 700. Information generated by the IMU 710 and the position sensors 712 may be compared with the position and orientation obtained by tracking the locators 708, for improved tracking accuracy of position and orientation of the HMD 700. Accurate position and orientation is important for presenting appropriate virtual scenery to the user as the latter moves and turns in 3D space.

The HMD 700 may further include a depth camera assembly (DCA) 711, which captures data describing depth information of a local area surrounding some or all of the HMD 700. To that end, the DCA 711 may include a laser radar (LIDAR), or a similar device. The depth information may be compared with the information from the IMU 710, for better accuracy of determination of position and orientation of the HMD 700 in 3D space.

The HMD 700 may further include an eye tracking system 714 for determining orientation and position of user's eyes in real time. The obtained position and orientation of the eyes also allows the HMD 700 to determine the gaze direction of the user and to adjust the image generated by the display system 780 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 702.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display comprising:
    a substrate transparent for visible light, the substrate having first and second opposed surfaces;
    a holographic diffuser at the second surface of the substrate;
    a projector for projecting an image onto the holographic diffuser through the first surface of the substrate, wherein the holographic diffuser is configured to scatter light of the image projected thereon back to the first surface within a pre-defined range of angles; and
    a holographic lens disposed at the first surface of the substrate and configured to receive the light scattered by the holographic diffuser for forming a corresponding image in angular domain at a distance from the holographic lens.

2. The display of claim 1, wherein the holographic diffuser is immersed into the substrate.

3. The display of claim 1, wherein the pre-defined range of angles of scattering light is at least two times wider than a cone angle of the light emitted by the projector and converging to a single pixel of the image projected onto the holographic diffuser.

4. The display of claim 1, wherein the holographic diffuser is coupled to the substrate without an air gap therebetween.

5. A display comprising:
    a substrate transparent for visible light, the substrate having first and second opposed surfaces;
    a holographic diffuser at the second surface of the substrate;
    a projector for projecting an image onto the holographic diffuser through the first surface of the substrate, wherein the holographic diffuser is configured to scatter light of the image projected thereon back to the first surface within a pre-defined range of angles; and
    a holographic reflector having optical power, disposed at the second surface of the substrate, and configured to reflect the light scattered by the holographic diffuser and reflected from the first surface back towards the first surface of the substrate, for forming a corresponding image in angular domain at a distance from the holographic reflector.

6. The display of claim 5, wherein an angle of incidence of light emitted by the projector onto the holographic diffuser exceeds 45 degrees.

7. A display comprising:
    a substrate transparent for visible light, the substrate having first and second opposed surfaces;
    a holographic diffuser at the second surface of the substrate;
    a projector for projecting an image onto the holographic diffuser through the first surface of the substrate, wherein the holographic diffuser is configured to scatter light of the image projected thereon back to the first surface within a pre-defined range of angles;
    a first holographic reflector having optical power, disposed at the first surface of the substrate, and configured to reflect the light scattered by the holographic diffuser back towards the second surface of the substrate; and
    a second holographic reflector having optical power, disposed at the second surface of the substrate, and configured to form the image in angular domain at a distance from the first holographic reflector.

8. The display of claim 7, wherein the second holographic reflector is coupled to the holographic diffuser without an air gap therebetween.

9. The display of claim 7, wherein the first holographic reflector, the substrate, the holographic diffuser, and the second holographic reflector form an optical stack.

10. The display of claim 9, wherein the optical stack transmits at least a portion of outside light, enabling a user of the display to see outside environment through the optical stack.

11. The display of claim 9, wherein an angle of incidence of light emitted by the projector onto the optical stack exceeds 45 degrees.

12. A method of displaying an image, the method comprising:
    projecting an image through a first surface of a transparent substrate onto a holographic diffuser disposed at a second surface of the substrate opposed to the first surface;
    scattering, using the holographic diffuser, light of the image projected thereon back to the first surface within a pre-defined range of angles; and
    forming, using a first holographic element having optical power, an image in angular domain at a distance from the first holographic element, the image in angular domain corresponding to the image projected onto the holographic diffuser, wherein:
    the first holographic element is a holographic reflector disposed at the first surface of the substrate for reflecting the light back towards the second surface of the substrate; and
    the image in angular domain is formed using the first holographic element and a second holographic element having optical power, the second holographic element being disposed at the second surface of the substrate.

13. The method of claim 12, wherein the light of the image projected onto the holographic diffuser is scattered at angles exceeding a total internal reflection (TIR) critical angle in the substrate.

14. The method of claim 12, wherein the second holographic element is a holographic reflector forming the image in angular domain at a distance from the second holographic element.

15. A display comprising:
    a projector for projecting an image;
    a transparent substrate having first and second opposed surfaces;
    a holographic diffuser disposed at the second surface downstream of the projector for receiving the image through the first surface and scattering light of the image back to the first surface within a pre-defined range of angles;

a holographic reflector having optical power, disposed at the first surface, and configured for receiving the light scattered by the holographic diffuser and reflecting the light back towards the second surface; and a holographic element having optical power, disposed at the second surface for forming an image in angular domain corresponding to the image projected by the projector, at a distance from the holographic element.

16. The display of claim 15, wherein:

the holographic diffuser, the substrate, and the holographic reflector, and the holographic element form an optical stack; and the pre-defined range of angles is above a total internal reflection (TIR) critical angle for the light scattered by the holographic diffuser into the substrate.

* * * * *